Dec. 10, 1929.    J. J. McKEON    1,739,162
METHOD FOR TREATING FLOTANT MATERIALS
Filed Feb. 27, 1926    3 Sheets-Sheet 1

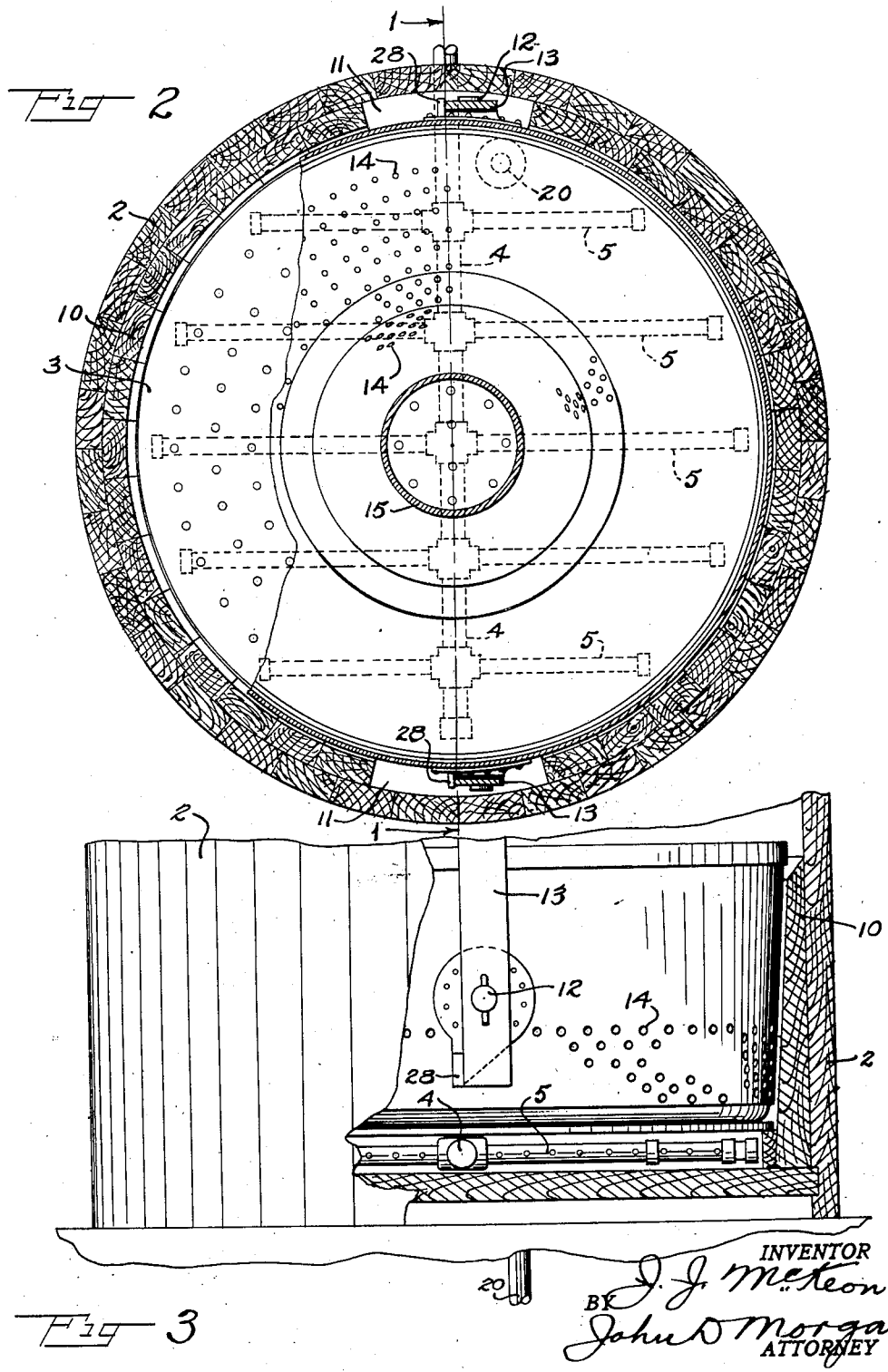

Dec. 10, 1929.  J. J. McKEON  1,739,162
METHOD FOR TREATING FLOTANT MATERIALS
Filed Feb. 27, 1926  3 Sheets-Sheet 3

INVENTOR
J. J. McKeon
BY John D. Morgan
ATTORNEY

Patented Dec. 10, 1929

1,739,162

UNITED STATES PATENT OFFICE

JOHN J. McKEON, OF TROY, NEW YORK, ASSIGNOR, BY MESNE ASSIGNMENTS, TO TOLHURST MACHINE WORKS, INC., OF TROY, NEW YORK, A CORPORATION OF NEW YORK

METHOD FOR TREATING FLOTANT MATERIALS

Application filed February 27, 1926. Serial No. 91,096.

The invention relates to a novel process for treating flotant material.

The invention also relates to a novel process for degumming silk.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel steps and combinations of steps herein shown and described.

The accompanying drawings, referred to herein and constituting a part hereof, illustrate one embodiment of the invention, and together with the description, serve to explain the principles of the invention.

Of the drawings:—

Fig. 2 is a horizontal section, substantially on the line 2—2 of Fig. 1, looking down in the direction of the arrows;

Fig. 3 is a fragmentary side elevation of the vat, partly broken away;

Figure 1:
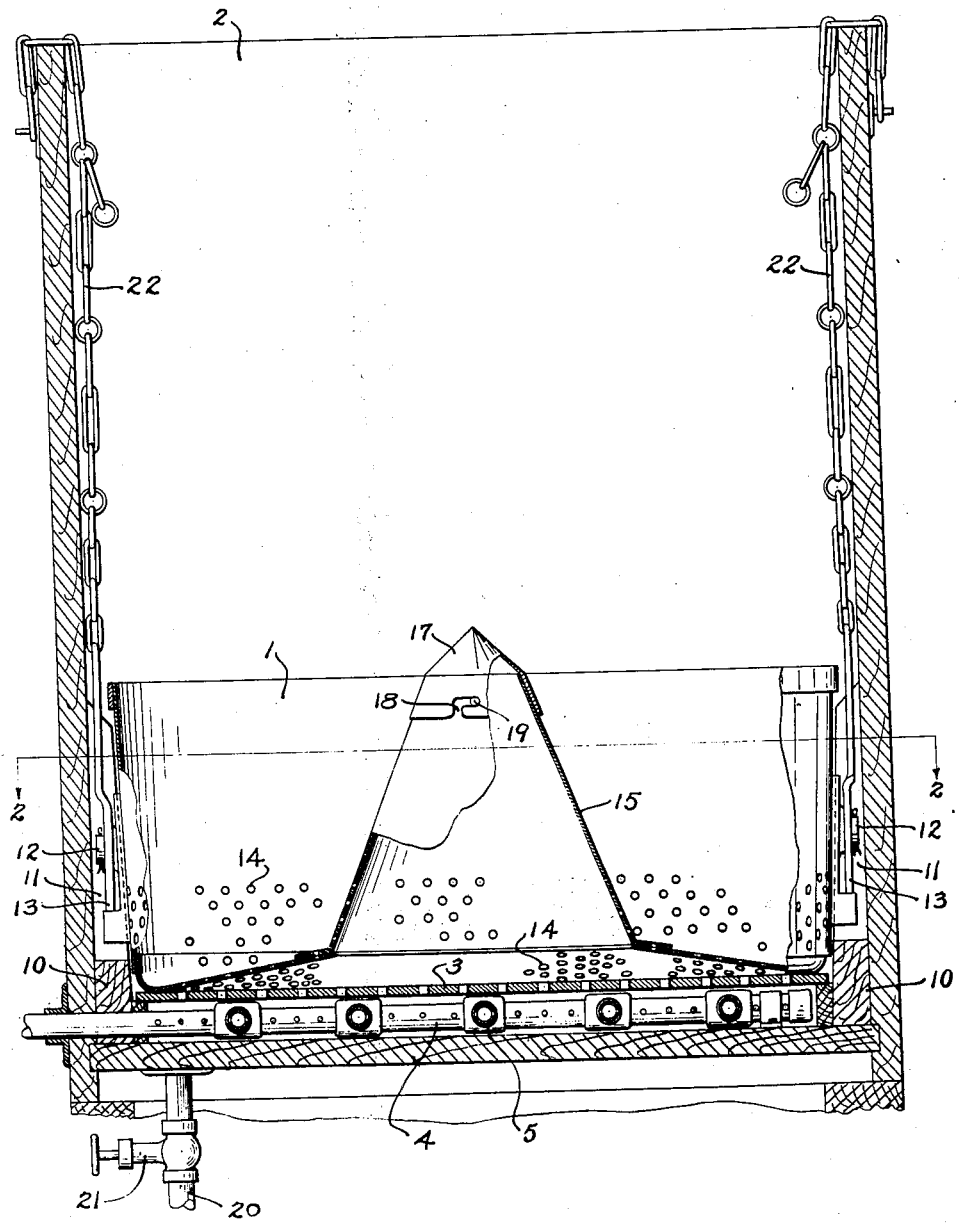
Fig. 1 is a vertical section, on line 1—1 of Fig. 2, showing one form of vat, and one form of a centrifugal basket which I may employ to carry out my method.

I will describe my invention more particularly with relation to degumming silk, though it is to be understood that my invention may be employed in treating any flotant material.

It is now the common practice in silk mills to degum silk by pulling out and cutting off one pound of silk from a bale of silk, putting that separated portion of silk into a net bag, tying the bag, and putting a plurality of these bags, usually about a hundred of them, into a vat, where they are cooked in a dissolving liquor heated by steam coils. The length of cook varies, but is usually about an hour, or an hour and a half. The operators, at the expiration of the cook, then hook out these different net bags, containing the silk, until they have the required number to fill a centrifugal separator. The centrifugal separators employed usually have a capacity of about one hundred pounds of silk. After hooking out all the net bags from the first cook containing the cooked silk—in the case given one hundred,—they are loaded on a truck and moved over to another part of the factory, where each bag is individually placed in the basket of a centrifugal separator. They are then subjected to centrifugal force in the separator to expel the liquor of the first cook. After this has been done they are severally again loaded on the truck and taken back to the same, or a similar vat, where they are again, for the second time, cooked in a fresh dissolving liquor, the first liquor having been withdrawn after the removal of the bags. The silk in the net bags is again cooked, in the second liquor, for approximately an hour, or an hour and a half. The bags are again, for the second time, hooked out of the vat, placed on a truck, and taken over to the separator, where they are again, for the second time, subjected to centrifugal action to drive out the liquor of the second cook. They are then individually taken out of the separator by the operators; the bags are untied, the silk removed therefrom, and fed to the ordinary dryer for the finished drying.

By my improved method and apparatus I greatly simplify the treatment of the silk and materially reduce the cost of degumming it.

In my invention I employ a centrifugal basket 1 which can be dropped into the vat 2 and permitted to rest upon the bottom plate 3 of the vat. The vat 2 is then substantially filled with the ordinary dissolving liquor which is heated by steam passing through the steam pipes 4 and 5.

Instead of cutting substantially a pound of silk from the bale, bagging and tying it, the operator simply takes a mass or hunk of silk from the bale, say a hundred pounds, and throws it, unbagged, into the vat 2, where it is loose and flotant in the cooking liquor. The silk is ordinarily in the form of waste so that no steps have to be taken to avoid tangling. It is to be understood, however, that my invention is not to be confined to treating silk waste. It will be cooked for the ordinary period, usually about an hour, or an hour and a half.

In cooking the silk I have found that it is very desirable to insure an even circulation of the liquor through the mass of the flotant silk. To prevent circulation between the interior of the vat 2, and the exterior of the centrifugal basket 1, I may mount in the vat any suitable form of baffle, as for example, a ring of wood or other material 10, cut away at 11, 11 so that the trunnions 12, 12 and the rods 13, 13 may pass into the baffle 10 and permit the basket to become seated upon the plate 3.

I have also found in practice that the centrifugal basket 1 should, preferably, not be provided with apertures or holes throughout its periphery, but on the contrary these holes 14, 14 should be in the bottom of the basket and in the sides for only a portion of their height. Of course, the exact height of these holes or perforations 14, 14 on the sides of the basket 1 may vary, as found convenient or expedient to obtain the best results. I have obtained excellent results with the centrifugal basket 1 perforated as shown in Fig. 1, these perforations serving to distribute the bubbles, due to boiling, throughout the flotant silk, where the bubbles seem to have a mechanical action on the gum contained in the silk.

Figure 6:
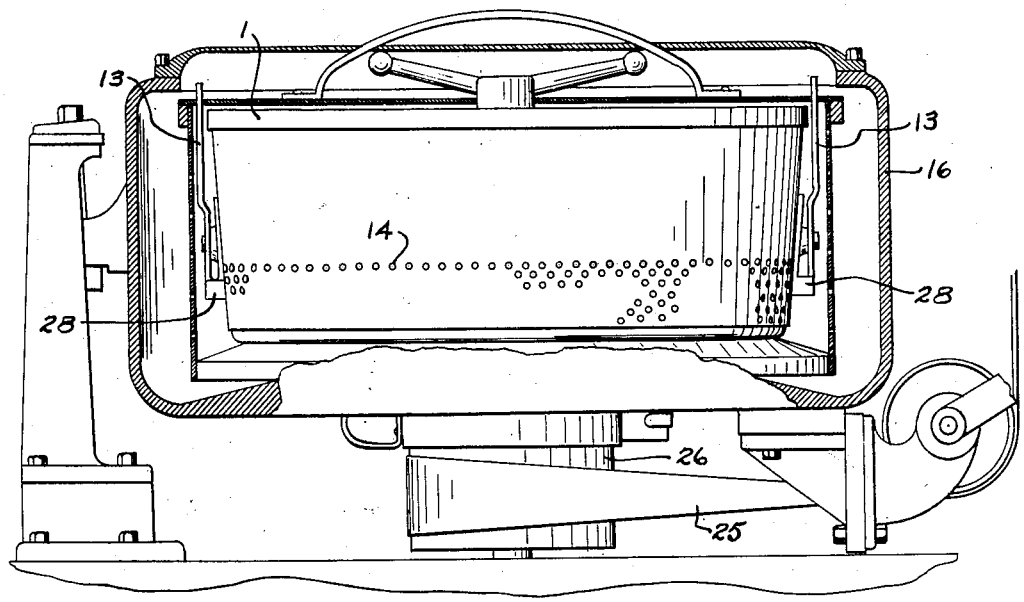
Fig. 6 is a vertical section through an ordinary form of centrifugal separator, showing the basket adapted to cooperate with such mechanism.

The particular form of centrifugal basket 1 may vary. In the drawings I have shown one form having a conical seat 15 which is adapted to cooperate with the proper member of a centrifugal separator, as for example, 16 (Fig. 6). To prevent circulation of the liquor through the conical seat 15 I close one end of the seat by a conical cap 17, the cap being provided with any suitable locking means to cooperate with the basket; as for example, the bayonet slots 18, 18 cooperating with the pins 19, 19 only one pin and slot being shown. This cap 17 effectively closes the small end of the conical seat 15 and prevents the passage of the liquor and the bubbles formed in the cooking.

After the silk has been cooked the required period the liquor in the vat 2 is withdrawn through the drain pipe 20 controlled by the valve 21. As the liquor passes out through the drain 20, the flotant silk falls by gravity, with the liquor, and is caught within the centrifugal basket 1. As soon as all the liquor has been withdrawn, the centrifugal basket 1, now filled with the mass of cooked unbagged silk, is lifted out of the vat 2 in any suitable manner, such as by the chains 22, 22, and taken bodily over to the centrifugal separator 16, the cap 17 being removed so that the basket can cooperate with the centrifugal separator (Fig. 6). The basket is then rotated through the belt 25, pulley 26 and vertical spindle (not shown) until substantially all the liquor absorbed by the silk has been extracted in the centrifugal separator 16.

The centrifugal basket 1 is then removed from the centrifugal separator 16 and taken again to the same vat 2, or a similar one, without handling or disturbing the mass of the substantially dry silk which it contains. The conical cap 17 is then again placed on the conical seat 15 and the centrifugal basket is lowered into the vat 2, as shown in Fig. 1. The valve 21 in the drain 20 is then closed, and new dissolving liquor is supplied to the vat 2 to permit the silk to be again cooked, for the second time. After the second cook, the valve 21 is operated to open the drain 20 to permit the second cooking liquor to be withdrawn, so that the flotant silk will again, for the second time, fall into the centrifugal basket 1, as the second cooking liquor is withdrawn from the vat 2. The basket 1 is then, for the second time, removed from the vat 2, taken to the centrifugal 16, where the mass or bulk of silk in the basket 1 is again, for the second time, dried. After treatment in the centrifugal 16 the basket is removed from the centrifugal and the mass of silk in the basket is dumped on a table or on the floor by rocking the basket 1 on its trunnions 12 so as to move the stops 28 from the arms 11. The comparatively dry silk is then fed to the ordinary dryer in the usual manner, where the final drying takes place.

Figure 4:
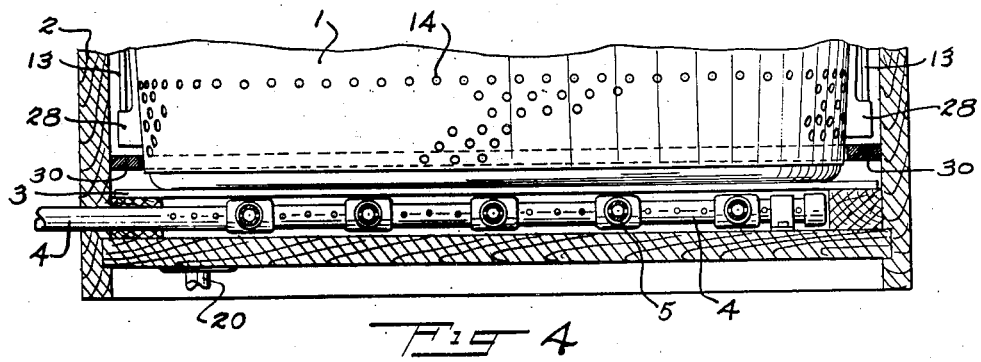
Fig. 4 is a fragmentary vertical section through the vat, showing a different form of baffle plate.
Figure 5:
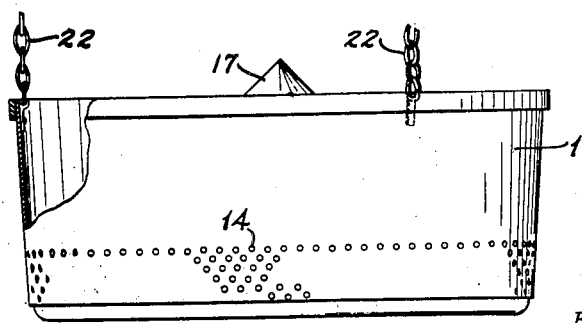
Fig. 5 is a side elevation, partly broken away, of the centrifugal separator basket.

Instead of using the baffle 10, I may use any other suitable form of baffle, such as a metal ring 30 (Fig. 4).

In a silk mill having twenty-four vats and several extractors handling 10,000 pounds of silk per day, it requires about twelve (12) men pulling and bagging and five (5) men boiling and extracting. By my invention the same quantity of silk can be degummed by two men pulling and three men boiling and extracting.

I also avoid entirely the expense of net bags, and the cost of their repair and replacements due to wear, and particularly the excessive wear due to hooking the bags out of the vats.

It will be clear that my method and apparatus may be employed where it is desired simply to collect flotant material in a receptacle by subsidence of any liquid in which it may have been washed, or otherwise treated, and whether or not it is subsequently treated.

Also it is clear that my method and apparatus may be employed to collect the flotant material in a receptacle, by drawing off the liquid, as above, and then removing the receptacle and further processing the material in the same receptacle, or in another receptacle.

The invention in its broader aspects is not limited to the specific mechanisms shown and described but departures may be made therefrom within the scope of the accompanying claims without departing from the principles of the invention and without sacrificing its chief advantages.

What I claim is:—

1. A method of degumming silk consisting in cooking it in a dissolving liquor while in a free flotant condition.

2. The method of degumming silk consisting in cooking it in a dissolving liquor while in a free flotant condition, and causing the bubbles formed in the heated liquor to assist in the degumming operation by acting mechanically upon the floatant silk.

3. The method of degumming silk consisting in cooking it in a dissolving liquor while in a free flotant condition, collecting it in mass at the end of the cook, drying the mass so collected by centrifugal force, again cooking the mass of silk in new cooking liquor, and at the end of the second cook collecting the silk in a mass for the second time, and again drying the mass of silk by subjecting it for the second time to centrifugal force.

4. The method of degumming silk consisting in cooking it in a dissolving liquor while in a free flotant condition, withdrawing the liquor at the end of the cook and collecting the flotant silk in a receptacle as the cooking liquor is withdrawn, and subjecting the mass of silk in the receptacle to centrifugal force to dry it.

5. The method of degumming silk consisting in cooking it in a dissolving liquor while in a free flotant condition, withdrawing the liquor at the end of the cook and collecting the flotant silk in a receptacle as the cooking liquor is withdrawn, and subjecting the mass of silk in the receptacle to centrifugal force to dry it, and again for the second time cooking the mass of silk in a dissolving liquor, collecting the flotant silk for the second time in the receptacle as the second cooking liquor is withdrawn, and again, for the second time, subjecting it to centrifugal force to dry the mass of silk.

6. The method of degumming silk consisting in placing the required quantity of free silk in a vat, cooking it with a dissolving liquor, withdrawing the cooking liquor from the vat and as the liquor is withdrawn automatically collecting the free silk into a receptacle at the bottom of the vat, and subjecting the mass of silk in the receptacle to centrifugal action to dry it.

7. The method of degumming silk consisting in placing the required quantity of free silk in a vat, cooking it with a dissolving liquor, withdrawing the cooling liquor from the vat and as the liquor is withdrawn automatically collecting the free silk into a receptacle at the bottom of the vat, and subjecting the mass of silk in the receptacle to centrifugal action to dry it, and again for the second time cooking the mass of silk in a dissolving liquor, withdrawing the second cooking liquor and as the liquor is withdrawn collecting the mass of silk by gravity in a receptacle, and drying the mass of silk in the receptacle.

8. The method of degumming silk consisting in placing the required quantity of free silk in a vat, cooking it with a dissolving liquor, withdrawing the cooling liquor from the vat and as the liquor is withdrawn automatically collecting the free silk into a receptacle at the bottom of the vat, and subjecting the mass of silk in the receptacle to centrifugal action to dry it, and again for the second time cooking the mass of silk in a dissolving liquor, withdrawing the second cooking liquor and as the liquor is withdrawn collecting the mass of silk by gravity in a receptacle, and subjecting the mass of silk in the receptacle to centrifugal force to dry it.

9. The method of degumming silk which comprises floating loose unbagged silk in a bath of dissolving liquor, boiling the liquor, collecting the mass of silk at the end of the cook, and centrifugally drying the collected mass.

10. The method of degumming silk which comprises cooking loose, flotant, unbagged silk in a bath of dissolving liquor having a receptacle immersed therein, and centrifugally drying the mass of silk in the receptacle at the end of the cook.

11. The method of degumming silk which comprises cooking loose, flotant, unbagged silk in a bath of dissolving liquor having a receptacle immersed therein, collecting the mass of silk by causing the mass to settle into the receptacle, and centrifugally drying the mass of silk in the receptacle at the end of the cook.

12. The method of treating flotant material which comprises floating said material in a bath of processing liquid having a receptacle immersed therein, causing the material to subside into the receptacle, and rotating the receptacle to dry the material.

13. The method of treating flotant material which comprises floating said material in a bath of processing liquid having a receptacle immersed therein, cooking the material, causing the material to subside into the receptacle, and rotating the receptacle to dry the material.

14. The method of degumming silk which comprises floating the silk in a bath of processing liquor above a receptacle immersed in said bath, withdrawing the receptacle from the bath while collecting the silk therein, and further processing the silk in the receptacle.

15. The method of degumming silk which comprises floating the silk in a bath of processing liquor above a receptacle immersed in said bath, effecting relative motion between the floating silk and the receptacle to collect the silk in the receptacle, and further processing the silk in the receptacle.

16. The method of treating flotant material which comprises floating said material in a bath of processing liquid above a receptacle immersed therein, effecting relative motion between the material and the receptacle to collect the flotant material therein, and rotating the receptacle to dry the material.

17. The method of treating flotant material which comprises floating said material in a bath of processing liquid above a receptacle immersed therein, withdrawing the liquor to cause the flotant material to subside into the receptacle, and hydro-extracting the material by rotating the receptacle.

18. The method of degumming silk which comprises cooking loose, flotant, unbagged silk in a bath of dissolving liquor above a receptacle immersed therein, collecting the mass of silk in the receptacle, and further processing the silk in said receptacle.

19. The method of degumming silk which comprises cooking loose, flotant, unbagged silk in a bath of dissolving liquor above a receptacle immersed therein, collecting the mass of silk in the receptacle, removing the receptacle and drying the silk in said receptacle.

In testimony whereof, I have signed my name to this specification.

JOHN J. McKEON.